United States Patent Office 2,976,809
Patented Mar. 28, 1961

2,976,809
CENTRIFUGAL PUMP AND METHOD OF ITS PRODUCTION

Walther Buschhorn, 11 Buchauerberg, and Walter Hans Deutschmann, 12 Lessingstrasse, both of Pegnitz, Upper Franconia, Germany Filed Aug. 9, 1955, Ser. No. 527,328

Claims priority, application Germany Aug. 11, 1954

2 Claims. (Cl. 103—103)

This invention relates to a molded casing of synthetic plastics for centrifugal pumps, consisting of several parts, and to a method of producing such casings by a pressing operation.

In the known types of such casings the part of the casing forming the cover and constituting a unitary structure with the axially directed suction connection can be produced by means of a relatively simple compression mold, while the pressing of the part of the casing provided with the pressure connection and surrounding the rotor with a concentric annular space or a spirally extending guide channel causes particular difficulties. Heretofore, it has been attempted to avoid these difficulties by producing the pressure connection as a separate molded part which was subsequently secured to the main part of the casing by cementing or in any other way.

It is an object of the present invention to provide a method for producing such casings in a simpler and more reliable manner, by means of a single tool, with greater accuracy and higher mechanical strength of the product.

With this and further objects in view, according to the invention the casing together with its pressure connection or pipe socket is produced as a single molded part, and the hollow duct or channel of the pressure branch is formed by a removable core member during the molding operation. For this purpose, it is particularly advantageous if the continuously enlarging pressure connection channel is turned from the line forming a tangent to the annular space or to the guide spiral into the radial direction and arranged along a circular arc whose center simultaneously forms the center of rotation for the withdrawing device serving to remove the removable core member forming the hollow channel of the pressure connection. For, by this shape of the pressure connection channel the drawing-out device may consist merely of a swingable arm which is mounted in the center of the circular arc along which the pressure connection channel is curved.

It is advantageous to provide on each side of our novel casing an annular projection serving as an abutment for certain parts of an outer casing known per se forming a safeguard against breakage. These abutment surfaces if desired may be used as packing surfaces, packings being inserted especially on the side where the impeller is disposed. A further casing part of molded material may be inserted especially on the side where the impeller is disposed, and formed with the suction connection in a manner known per se.

A special advantage is achieved if a concentric annular projection is provided in the molding operation on the side of the pump casing facing away from the impeller, said annular projection serving for centering a cylindrical sleeve which in its turn is also produced as an integral molded part of plastic material and accommodates the shaft packing. If this sleeve is constructed in a suitable manner, it may accommodate both a slip ring packing and a stuffing box packing. To this end, the sleeve preferably is formed with internal shoulders which are also molded in one piece with this cylindrical sleeve. An external annular shoulder which is also provided in the molding operation, serves as an abutment for a thrust collar, so that the cylindrical sleeve may be connected with the pump casing in a liquid proof manner.

Other and further objects, features and advantages of the invention will be pointed out hereinafter and appear in the appended claims forming part of the application.

In the accompanying drawings a preferred embodiment of the invention is shown by way of illustration and not by way of limitation.

Figure 2:
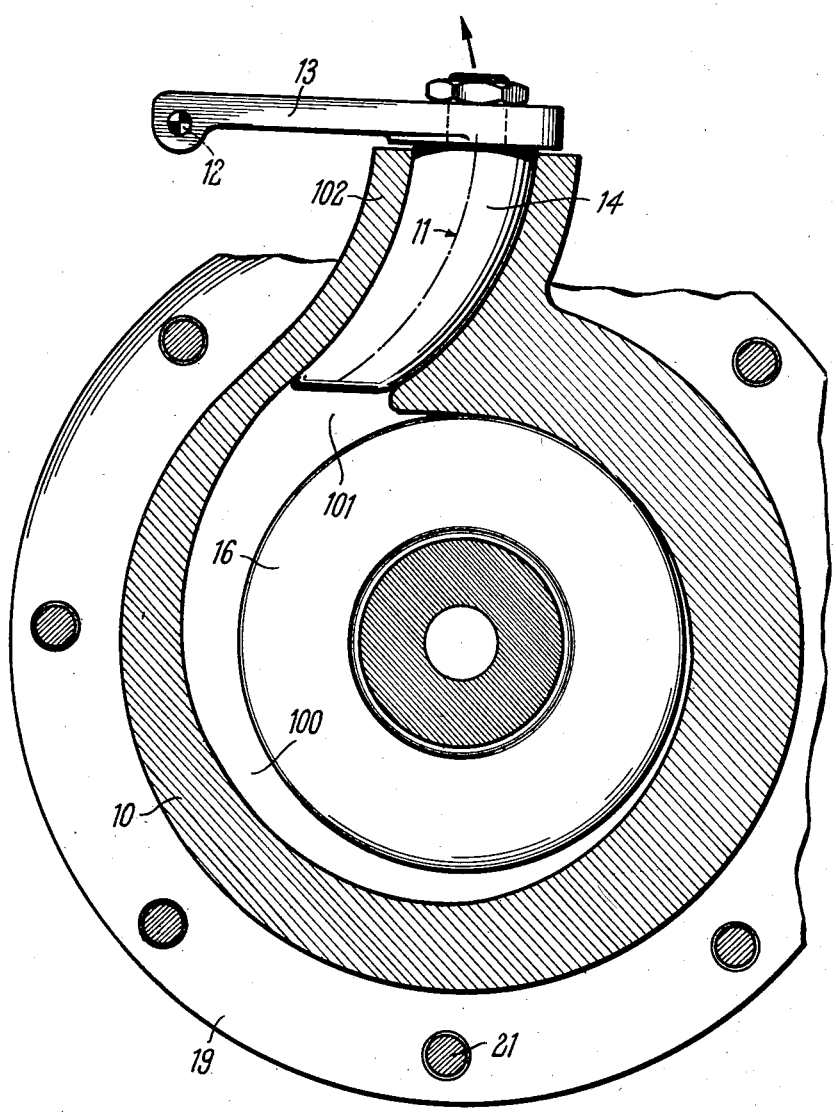
Fig. 2 is a section on line 2—2 of Fig. 1, on a smaller scale.

Referring now to the drawing in greater detail, it will be seen that the pump casing 10 is formed with a spirally-shaped annular space 100 which at 101 passes over into a pressure connection 102, Fig. 2, enlarging continuously in an outward direction. Its dash-dotted center line 11 shows that the pressure connection conduit turns from a direction forming a tangent line to the annular space 100 into a radial direction, being arranged on a circular arc of such a radius that the center point 12 of this circular arc, located outside of the pump casing may simultaneously serve as the fulcrum of a schematically illustrated holding device 13 of a core 14 which has to be swung into the press mold for producing the casing 10 and on completion of the casing has to be swung out of the same.

Figure 1:
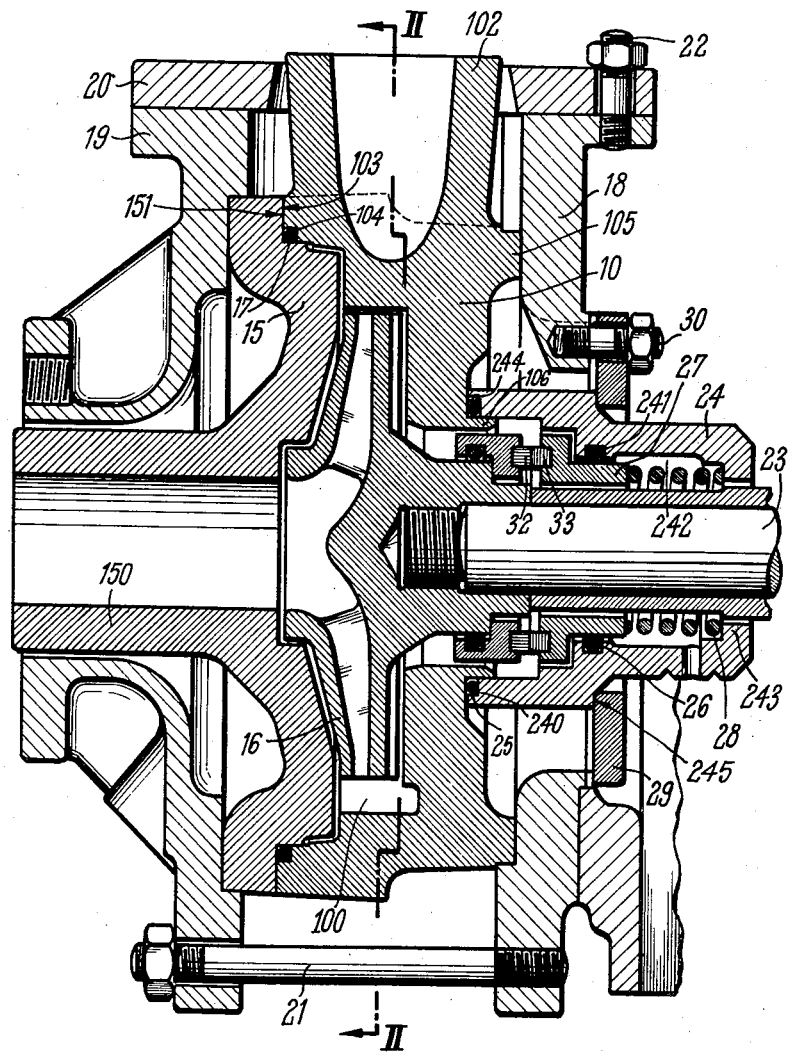
Fig. 1 is a diagrammatic section through the pump casing.

The casing 10 is provided with a cover 15, Fig. 1, forming together with the casing a hollow space for operation of the impeller 16 and being molded integral with the suction connection 150, Fig. 1, of a synthetic plastic. The cover 15 is formed with an annular recess surface 151 engaging an annular projection 103 of the casing 10, which projection 103 in its turn is provided with an annular groove 104 for reception of a packing ring 17. Arranged at 105 is a further annular projection of the casing 10 engaging the portion 18 of an additional casing intended to form a safeguard against, or in case of, breakage, comprising also parts 19 and 20, enclosing the casing parts 10 and 15 between each other.

A further annular projection or collar 106 is provided on the casing 10 concentrically to the shaft 23 of the impeller 16, so as to serve for centering a cylindrical sleeve 24. Said sleeve 24 is formed with internal annular grooves 240, 241 for reception of packing rings 25 or 26, a recess 242 for reception of the portion 27 of a slip-ring packing and an internal shoulder 243 forming an abutment for the compression spring 28 of the slip ring packing. Moreover, the sleeve 24 is provided with an abutment 244, formed with a groove 240 and engaging the casing 10, and with an outer shoulder 245 engaged by a ring 29 which can be pressed against the casing part 18 by means of screws 30 in such a way that the seat of the sleeve 24 at 244 is leakage proof. The parts 31, 32, and 33 belong to the per se known slip-ring packing.

In the pump according to the present invention the parts 10, 15, and 24 consist of a pressable synthetic plastic. If desired, the impeller 16 may also be produced of such a material. The parts 15 and 24 may be produced by means of simple tools in a manner known per se, so that they may be shaped in any suitable manner. The casing part 10, on the contrary, has to be shaped in a special manner owing to the fact that it is formed in one piece with the pressure connection with the result that a core has to be introduced into it. By the shaping according to the present invention it has been possible to harmonize with each other the requirements arising from the manufacture and the requirements arising from the operation of the pump, so that the shape of the pressure branch which is advantageous for the conditions of flow simultaneously permits a particularly favorable insertion and removal of the core. Moreover, in shaping the casing part 10, special care has been taken that not only one kind of shaft packing can be used, but to make it possible, by the provision of the centering collar 106 on the one hand, and of the sleeve 24 on the other hand, to accommodate within this sleeve shaft packings of different kind.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

We claim:

1. A centrifugal pump comprising, in combination, a housing, a casing in said housing consisting of synthetic material defining an annular central space, a pressure connection forming a unitary structure with said casing, said pressure connection defining a channel widening continually along all portions of its circumference to its discharge end and being deflected from a direction being tangential to the annular central space of said casing to a direction extending radially of said annular central space, an impeller arranged rotatably in said casing, a shaft supporting said impeller, an annular projection defined by said casing and arranged concentrically with said shaft, a cylindrical sleeve centered by said annular projection, a collar mounted on said housing supporting said cyindrical sleeve, a packing ring, and an outer shoulder presented by said cylindrical sleeve and forming the counter member for said ring in a manner providing for leak proof pressure engagement between said cylindrical sleeve and said casing.

2. A centrifugal pump comprising a housing, a casing in said housing consisting of synthetic material defining an annular central space, a pressure connection forming a unitary structure with said casing, said pressure connection defining a channel widening continually along all portions of its circumference to its discharge end and being deflected from a direction being tangential to the annular central space of said casing to a direction extending radially of said annular central space, a shaft supporting said impeller, an annular projection defined by said casing and arranged concentrically with said shaft, a cylindrical sleeve centered by said annular projection, a collar mounted on said housing supporting said cylindrical sleeve, a packing ring, an outer shoulder presented by said cylindrical sleeve and forming the countermember for said ring in a manner providing for leak proof pressure engagement between said cylindrical sleeve and said casing, said cylindrical sleeve having an inner shoulder a slip ring packing arranged coaxially with said shaft, and a compression spring forming an abutment for said slip ring packing.

References Cited in the file of this patent
UNITED STATES PATENTS

| | | |
|---|---|---|
| 1,577,886 | Willshaw | Mar. 23, 1926 |
| 2,107,260 | Ihara | Feb. 1, 1938 |
| 2,190,670 | Mann | Feb. 20, 1940 |
| 2,283,263 | Kates | May 19, 1942 |
| 2,283,348 | Adams et al. | May 19, 1942 |
| 2,301,662 | Wilson | Nov. 10, 1942 |
| 2,343,511 | Lobanoff | Mar. 7, 1944 |
| 2,347,386 | Adams | Apr. 25, 1944 |
| 2,433,589 | Adams | Dec. 30, 1947 |
| 2,470,563 | Jennings | May 17, 1949 |
| 2,473,061 | Jacobsen | June 14, 1949 |
| 2,581,504 | Wilfley et al. | Jan. 8, 1952 |
| 2,672,821 | Montgomery | Mar. 23, 1954 |
| 2,764,099 | Wernert | Sept. 25, 1956 |

FOREIGN PATENTS

| | | |
|---|---|---|
| 285,335 | Great Britain | Feb. 16, 1928 |
| 341,305 | Great Britain | Jan. 15, 1931 |
| 427,675 | Italy | Nov. 26, 1947 |
| 719,311 | Great Britain | Dec. 1, 1954 |